(12) United States Patent
Kuntner

(10) Patent No.: US 11,015,707 B2
(45) Date of Patent: May 25, 2021

(54) HYDRAULIC CIRCUIT, TORQUE TRANSMISSION DEVICE HAVING A HYDRAULIC CIRCUIT, AND METHOD FOR OPERATING A HYDRAULIC CIRCUIT

(71) Applicant: AVL COMMERCIAL DRIVELINE & TRACTOR ENGINEERING GMBH, Steyr (AT)

(72) Inventor: Stefan Kuntner, Asten (AT)

(73) Assignee: AVL COMMERCIAL DRIVELINE & TRACTOR ENGINEERING GMBH, Steyr (AT)

( * ) Notice: Subject to any disclaimer, the term of this patent is extended or adjusted under 35 U.S.C. 154(b) by 387 days.

(21) Appl. No.: 16/096,814

(22) PCT Filed: Apr. 25, 2017

(86) PCT No.: PCT/EP2017/059778
§ 371 (c)(1),
(2) Date: Oct. 26, 2018

(87) PCT Pub. No.: WO2017/186710
PCT Pub. Date: Nov. 2, 2017

(65) Prior Publication Data
US 2020/0292068 A1 Sep. 17, 2020

(30) Foreign Application Priority Data
Apr. 26, 2016 (AT) .............. A 50368/2016

(51) Int. Cl.
*F16H 61/12* (2010.01)
*F16H 61/688* (2006.01)
(Continued)

(52) U.S. Cl.
CPC ............. *F16H 61/12* (2013.01); *F16D 25/10* (2013.01); *F16D 25/14* (2013.01);
(Continued)

(58) Field of Classification Search
None
See application file for complete search history.

(56) References Cited

FOREIGN PATENT DOCUMENTS

| AT | 516475 | 5/2016 |
|----|--------|--------|
| CN | 102777592 | 11/2012 |

(Continued)

OTHER PUBLICATIONS

Translated International Preliminary Report on Patentability for International (PCT) Patent Application No. PCT/EP2017/059778, dated Nov. 8, 2018, 6 pages.

(Continued)

*Primary Examiner* — Timothy Hannon
(74) *Attorney, Agent, or Firm* — Sheridan Ross P.C.

(57) ABSTRACT

The invention relates to a hydraulic circuit having a first hydraulically actuable clutch that is closed in a rest state and a second hydraulically actuable clutch that is closed in the rest state, wherein the hydraulic circuit is configured in such a way that a hydraulic medium present in a main pressure line can be loaded with a working pressure by a pressure generating device and/or a pressure accumulator, and the hydraulic medium can be discharged for pressure dissipation via a main return line into the return reservoir. In some embodiments, the hydraulic circuit has a first distributor pressure line and a separate, first collector return line for the hydraulic supply of a first part circuit and at least one separate, second distributor pressure line and at least one separate, second collector return line for the hydraulic supply of a second part circuit, and the first clutch is assigned to the first part circuit and the second clutch is assigned to the second part circuit.

23 Claims, 5 Drawing Sheets

Figure 1:
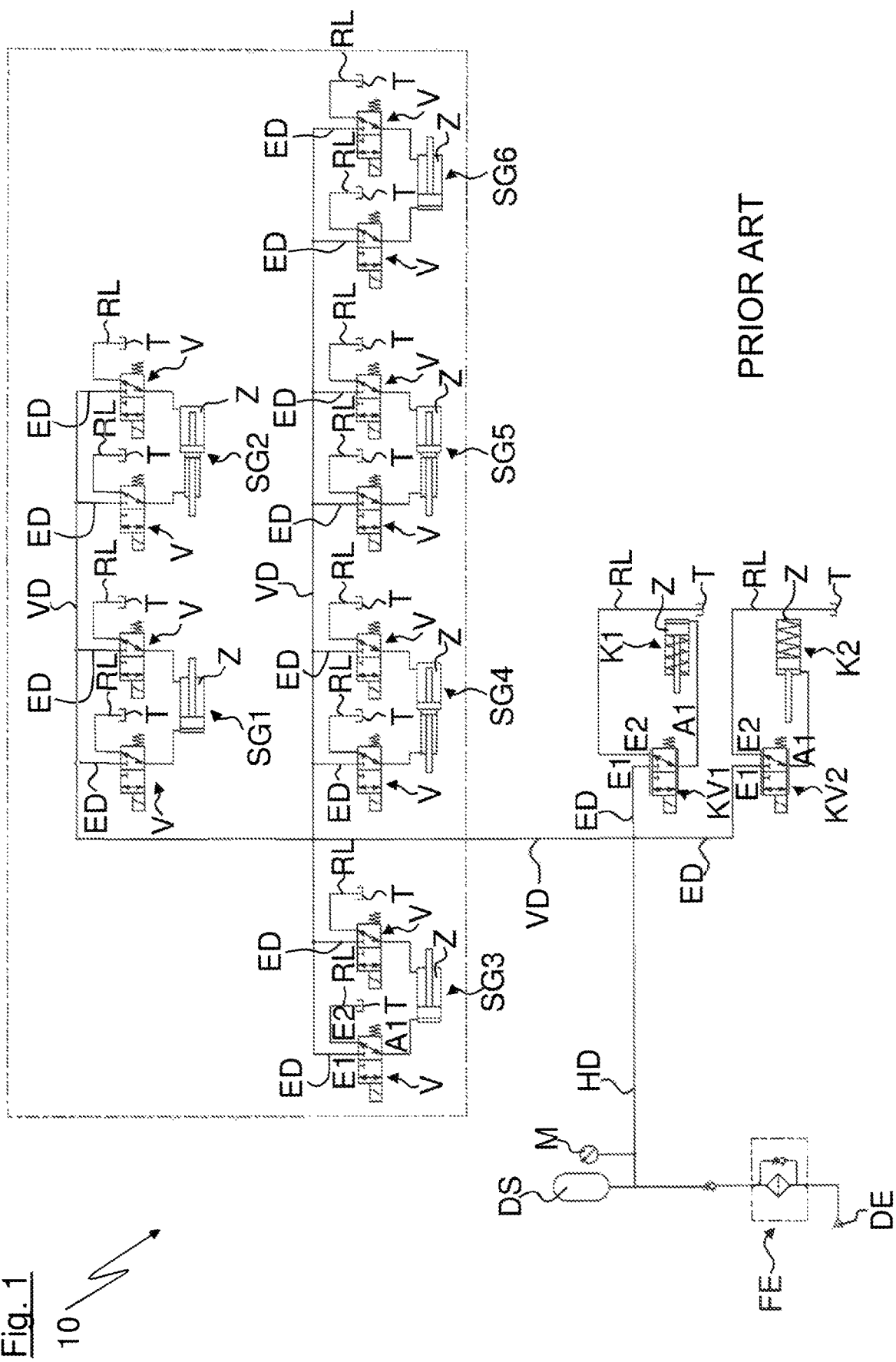

(51) Int. Cl.
    *F16D 48/02*     (2006.01)
    *F16D 48/06*     (2006.01)
    *F16D 25/10*     (2006.01)
    *F16D 21/06*     (2006.01)

(52) U.S. Cl.
    CPC ....... *F16D 48/0206* (2013.01); *F16D 48/066* (2013.01); *F16H 61/688* (2013.01); *F16D 2021/0653* (2013.01); *F16D 2048/0221* (2013.01); *F16D 2048/0266* (2013.01); *F16D 2048/0272* (2013.01); *F16H 2061/1208* (2013.01); *F16H 2061/1224* (2013.01); *F16H 2061/1264* (2013.01); *F16H 2061/1276* (2013.01)

(56) References Cited

FOREIGN PATENT DOCUMENTS

| | | |
|---|---|---|
| CN | 105026798 | 11/2015 |
| DE | 10134115 | 1/2003 |
| DE | 102004033362 | 1/2006 |
| DE | 102005015911 | 10/2006 |
| DE | 102011100838 | 11/2012 |
| EP | 2410212 | 1/2012 |
| EP | 2647883 | 10/2013 |

OTHER PUBLICATIONS

International Search Report prepared by the European Patent Office dated Jul. 24, 2017, for International Application No. PCT/EP2017/059778.
Official Action for Austria Patent Application No. A 50368/2016, dated Jan. 25, 2017, 3 pages.

HYDRAULIC CIRCUIT, TORQUE TRANSMISSION DEVICE HAVING A HYDRAULIC CIRCUIT, AND METHOD FOR OPERATING A HYDRAULIC CIRCUIT

CROSS REFERENCE TO RELATED APPLICATIONS

This application is a national stage application under 35 U.S.C. 371 and claims the benefit of PCT Application No. PCT/EP2017/059778 having an international filing date of 25 Apr. 2017, which designated the United States, which PCT application claimed the benefit of Austria Patent Application No. A50368/2016 filed 26 Apr. 2016, the disclosure of each of which are incorporated herein by reference in their entireties.

The invention relates to a hydraulic circuit, preferably for a torque transmission device having a hydraulically actuable dual-clutch, particularly for controlling of a torque transmission device with a hydraulically actuable dual-clutch, wherein the hydraulic circuit comprises a first hydraulically actuable clutch which is closed in a rest state and a second hydraulically actuable clutch which is closed in the rest state as well as a pressure generating device and/or a pressure accumulator, a main pressure line hydraulically coupled to the pressure generating device and/or to the pressure accumulator as well as at least one distributor pressure line hydraulically coupled to the main pressure line, a return reservoir and a main return line hydraulically coupled to the return reservoir as well as at least one collector return line coupled to the main return line. The hydraulic circuit is thereby configured such that a hydraulic medium present in the main pressure line can be loaded with a working pressure by means of the pressure generating device and/or by means of the pressure accumulator and the hydraulic medium can be discharged for pressure dissipation via the main return line into the return reservoir. The hydraulic circuit is further configured so as to be capable of operating in at least two operating states, in particular in a first operating state, which preferably corresponds to a normal operating state, and in at least one second operating state, which preferably represents a fault mode having in particular the object of achieving a safe state in case of malfunction, in particularly a safe state of a system controlled by the hydraulic circuit.

To be understood as a safe state in this context, in particular in the sense of the invention, is a state which always enables safely terminating the operation of the hydraulic circuit and/or a system controlled by the hydraulic circuit. Since in some cases closing both clutches at the same time upon a malfunction does not always allow safely terminating the operation of the hydraulic circuit and/or a system controlled by the hydraulic circuit, simultaneously closing both clutches upon a malfunction does not represent a safe state and should be avoided.

Different concepts are known in the prior art for achieving a safe state upon malfunction for hydraulic circuits having two clutches, particularly for systems having such hydraulic circuits in which the simultaneous closing of both clutches can be avoided.

Known on the one hand is configuring both clutches as so-called "normally open" clutches; i.e. as clutches which are open in the rest state, these also being referred to as so-called spring-to-open clutches and which because of a provided return spring, open as soon as insufficient hydraulic working pressure occurs. Using two "normally open" clutches can ensure that one of the two clutches will always open due to the restoring force of the return spring when sufficient hydraulic working pressure can no longer be provided, as for example in case of a malfunction.

Yet the above-described "normally open" clutches have the disadvantage that additional energy must always be provided to close the clutch in order to overcome the restoring force of the return spring. This is not the case with so-called "normally closed" clutches, which are closed in the rest state due to a provided return spring and are thus also referred to as spring-to-close clutches, such that a "normally closed" clutch enables a more energy-efficient operation of the hydraulic circuit than a "normally open" clutch.

Further known from the prior art are hydraulic circuits having two hydraulically actuable clutches, in which a first of the two hydraulically actuable clutches is configured as a "normally open" clutch; i.e. as a clutch open in the rest state, and the second clutch as a "normally closed" clutch; i.e. as a clutch which is closed in the rest state.

Furthermore known from the prior art is, in particular from the post-published AT 50771/2014 by the same applicant, configuring both clutches; i.e. both the first clutch as well as the second clutch, as a "normally closed" clutch and providing additional appropriate safety precautions so as to be able to prevent both clutches from closing simultaneously upon a malfunction and being able to achieve a safe state.

As an additional safety precaution, the aforementioned AT 50771/2014 proposes hydraulically coupling both clutches to the main pressure line as well as the main return line by means of a common distributor pressure line as well as a common collector return line and a corresponding hydraulic switching valve able to be switched between two switching states, which acts as a type of safety valve. The hydraulic switching valve is thereby configured and arranged in the hydraulic circuit such that in one of its two switching states, the distributor pressure line is disconnected from the main pressure line and the collector return line is connected to the main pressure line so that a working pressure present in the main pressure line will be transmitted to the collector return line, and consequently both clutches can be opened at the same time. The simultaneous opening of both clutches in the event of a malfunction can, however, be undesirable in some vehicles and/or under certain driving conditions because power transmission, for example to a combustion engine, is thereby completely cut.

Moreover known from the aforementioned AT 50771/2014 is additionally providing one or more other components, in particular one or more hydraulically actuable actuator assemblies in form of switching groups or other hydraulically actuable actuator assemblies, wherein the individual actuator assemblies thereby each usually comprise at least one hydraulically actuable actuator cylinder as well as correspondingly configured controllable hydraulic switching valves for switching or selectively actuating of the associated actuator cylinder respectively. Such corresponding hydraulically actuable switching groups allow for example the switching of different gears in a torque transmission device.

In conjunction hereto, the aforementioned AT 50771/2014 further proposes likewise hydraulically clutch some of the switching groups to the main pressure line and the main return line via the distributor pressure line as well as the collector return line by means of the hydraulic switching valve acting as a safety valve so that not only the two clutches can be opened by a working pressure in the associated collector return line in the event of malfunction but the relevant switching groups can also be brought into a defined state, wherein the safety, in particular the safety of a system controlled by means of the hydraulic circuit, can be even further improved.

Given the above, it is a task of the invention to provide an alternative hydraulic circuit, in particular an improved hydraulic circuit, in which despite the use of two "normally closed" clutches, a safe state can be achieved in at least one operating state, in particular in a fault mode, wherein in particular only one of the two clutches opens. A further task of the invention is that of providing a torque transmission device having such a hydraulic circuit, a vehicle with a torque transmission device having such a hydraulic circuit, a method for operating such a hydraulic circuit as well as a method for operating an aforementioned vehicle.

The invention solves these tasks by means of the teaching of the independent claims. Preferential further developments of the invention constitute the subject matter of the subclaims and will be described in greater detail below. The content of the claims is made a part of the description.

A hydraulic circuit according to the invention is characterized by the hydraulic circuit comprising a first distributor pressure line and a separate first collector return line for the hydraulic supply of a first part circuit as well as at least one separate second distributor pressure line, which is hydraulically disconnectable from the first distributor pressure line, and at least one separate second collector return line, which is hydraulically disconnectable from the first collector return line, for the hydraulic supply of a second part circuit.

According to the invention, the first clutch is thereby preferably assigned to the first part circuit and can be hydraulically connected to the first distributor pressure line or the first collector return line while the second clutch is assigned to the second part circuit and can be hydraulically connected to the second distributor pressure line or the second collector return line.

According to the invention, the hydraulic circuit is preferably further configured such that either the first collector return line or the second collector return line is hydraulically connected to the main pressure line in the second operating state, particularly in a fault mode.

The hydraulic circuit is thereby preferably configured to be filled with a hydraulic medium, wherein the hydraulic circuit is particularly preferentially filled with an accordingly suitable hydraulic medium while in use.

In the sense of the invention, a hydraulic medium thereby refers to a medium which may be used in hydraulic systems for transmitting energy, particularly by volumetric flow and pressure, wherein the hydraulic medium is preferably a fluid, in particular a hydraulic fluid. Suitable hydraulic media are generally known from the prior art such that further details in this regard will be dispensed with and reference is made to the prior art.

Preferentially, the first clutch and/or the second clutch are in each case configured as hydraulically actuable friction clutches, in particular as hydraulically actuable multi-disc clutches, which are generally known from the prior art such that further details in this regard will be dispensed with and reference made to the prior art.

A torque transmission device in the sense of the invention is understood as an apparatus for transmitting torque, wherein a hydraulic circuit according to the invention is particularly preferentially suited for a hydraulically actuable torque transmission device configured as a dual-clutch transmission, in particular for controlling such a torque transmission device.

A dual-clutch transmission in the sense of the invention is understood as a transmission having two clutches which, due to the arrangement and configuration of the two clutches, preferably enables gear change without tractive force interruption.

In the sense of the invention, "hydraulically actuable" is understood as the possibility of actuation by means of at least one hydraulically actuable actuator, wherein hydraulically actuable actuator assemblies such as, for example, hydraulically actuable torque transmission devices, hydraulically actuable clutches and hydraulically actuable switching groups, are generally well known from the prior art.

In the sense of the invention, hydraulically actuable actuator assemblies denote assemblies comprising at least one hydraulically actuable actuator as well as preferably for controlling a working pressure to which the actuator is subjected one or more correspondingly configured hydraulic switching valves, wherein the actuator is thereby preferentially actuated as a function of the working pressure to which the actuator is subjected. An actuator assembly is furthermore particularly preferentially hydraulically coupled each; i.e. hydraulically connected or hydraulically connectable, to at least one pressure line for applying a hydraulic working pressure as well as to at least one return line each, via which the hydraulic working pressure can be reduced by discharging the hydraulic medium into a return reservoir.

With hydraulically actuable actuator assemblies in form of hydraulically actuable clutches, the associated hydraulic switching valve is commonly referred to as a clutch actuator valve, by means of which the opening and closing of the clutch can usually be controlled.

Preferably, a hydraulic circuit according to the invention comprises a first hydraulic clutch actuator valve for actuating the first clutch and a second hydraulic clutch actuator valve for actuating the second clutch, wherein particularly the first clutch can be hydraulically connected to the first distributor pressure line or the first collector return line via the first clutch actuator valve, and wherein preferably the second clutch can be hydraulically connected to the second distributor pressure line or the second collector return line via the second clutch actuator valve. This means that the first clutch and the second clutch each are preferentially hydraulically connected to one of the respective distributor pressure lines and respectively associated collector return line via a respective clutch actuator valve.

Particularly preferentially, the first clutch is thereby in a first switching state of the first clutch actuator valve hydraulically connected to the first distributor pressure line and in a second switching state of the first clutch actuator valve to the first collector return line, wherein an opening of the clutch is preferably effected upon sufficient working pressure in the first distributor pressure line or the first collector return line, and a closing of the first clutch upon a drop in pressure due to discharge of hydraulic medium via the first collector return line.

The second clutch is particularly preferentially in a first switching state of the second clutch actuator valve hydraulically connected accordingly to the second distributor pressure line and in a second switching state of the second clutch actuator valve to the second collector return line, wherein an opening of the clutch is preferably effected upon sufficient working pressure in the second distributor pressure line or the second collector return line, and a closing of the second clutch upon a drop in pressure due to discharge of hydraulic medium via the second collector return line.

Particularly preferentially, at least one of the clutch actuator valves, in particular each respective first clutch actuator valve and second clutch actuator valve, are configured as 3/2-way valves having a first inlet connection, a second inlet connection and an outlet connection. Preferably at least one of the clutch actuator valves is thereby configured such that in the first switching state the first inlet connection is hydraulically connected to the outlet connection and in the second switching state the second inlet connection is hydraulically connected to the outlet connection.

A pressure generating device in the sense of the invention is understood as a device configured to produce or provide a required hydraulic working pressure, wherein the pressure generating device is preferably a hydraulic pump.

In the sense of the invention, a pressure accumulator is a reservoir in which a medium can be stored under pressure, wherein the pressure accumulator in this case is preferably configured as a hydraulic accumulator able to release hydraulic energy upon discharging.

As defined by the invention, two or more components being "hydraulically coupled" together refers to the respective components being hydraulically connected or hydraulically connectable; i.e. able to be hydraulically connected together, for example by an intermediary valve being switched such that a hydraulic connection is created.

In the sense of the invention, the main pressure line is understood as a pressure line or corresponding line section able to be pressurized to the required working pressure which is hydraulically connected to the pressure generating device and/or pressure accumulator and provided to supply one or more distributor pressure lines with the required working pressure.

A distributor pressure line in the sense of the invention is understood as a pressure line able to be pressurized to the required working pressure which represents a branch of line connected or connectable to the main pressure line and serves in the hydraulic supply of at least one actuator assembly, preferably the hydraulic supply of multiple actuator assemblies.

A single pressure line in the sense of the invention is a branch of line able to be pressurized to the required working pressure which is provided only for the supplying of one hydraulically actuable actuator assembly.

Accordingly, a main return line in the sense of the invention is a return line or corresponding line section provided for the return of the hydraulic medium and connected to the return reservoir, via which hydraulic medium can be discharged from one or more collector return lines into the return reservoir.

A collector return line in the sense of the invention is a branch of line connected to the main return line which serves in the return of hydraulic medium from at least one actuator assembly, preferably the return of hydraulic medium from multiple actuator assemblies.

A single return line in the sense of the invention is a branch of line which is provided only for the return of hydraulic medium from one hydraulically actuable actuator assembly.

A return reservoir in the sense of the invention is understood as a reservoir for providing the hydraulic medium circulating in the hydraulic circuit, from which particularly the pressure generating device draws the hydraulic medium.

The specific design of a hydraulic circuit according to the invention with two distributor pressure lines as well as two collector return lines, with one being respectively provided for the supply of a first part circuit and the other for the supply of a second part circuit, and wherein the first clutch is assigned to the first part circuit and can be hydraulically connected to the first distributor pressure line or the first collector return line and the second clutch is assigned to the second part circuit and can be hydraulically connected to the second distributor pressure line or the second collector return line, and the fact that either the first collector return line or the second collector return line is hydraulically connected to the main pressure line in the second operating state, enables one of the two clutches to always open in the second operating state, which is preferably a fault mode, even with two "normally closed" clutches, such that a defined safe state can be achieved without, however, tractive force being completely disengaged by the opening of both clutches, particularly in the case of a torque transmission device having a hydraulic circuit in accordance with the invention.

That means that in a fault mode, for example when only an insufficient amount of working pressure can be provided in a distributor pressure line due to a leak or a clutch actuator valve being defective or the like, a collector return line can be connected to the main pressure line in a hydraulic circuit according to the invention so that one of the two clutches can be always opened by virtue of the working pressure then present in the collector return line.

Furthermore, a malfunction in one of the part circuits does not necessarily result in malfunction of the other part circuit in a hydraulic circuit configured according to the invention. Particularly advantageous safe hydraulic circuit functioning can thereby be achieved.

It goes without saying that the safe state can only be achieved as long as the working pressure necessary to open the clutch can be provided in the main pressure line and also transmitted to one of the two collector return lines as well as further to the respective clutch. For example, in the case of failure of the pressure generating device and simultaneous failure of the pressure accumulator, which has the consequence of sufficient working pressure no longer being able to be produced in the main pressure line, even the inventive hydraulic circuit can no longer achieve a safe state. Meaning that in some cases, in particular given particularly high safety requirements, it can be advantageous or even necessary to, for example, potentially provide for redundancy with regard to the pressure generating device and/or the pressure accumulator as well as their controlling components so as to always be able to ensure the sufficient supply of the required working pressure in the main pressure line.

In one advantageous embodiment of a hydraulic circuit according to the invention, the hydraulic circuit is configured such that in the first operating state, in particular in a normal operating state, the distributor pressure lines each are hydraulically connected to the main pressure line and the collector return lines to the main return line each. This can thereby ensure that in the first operating state the respectively applied working pressure in the main pressure line is applied in both distributor pressure lines and that the hydraulic medium can be discharged into the return reservoir hydraulically connected to the main return line via the respective collector return lines.

In a further advantageous embodiment of an inventive hydraulic circuit, the hydraulic circuit is configured such that in the second operating state, the associated distributor pressure line is hydraulically disconnected from the main pressure line. In other words, meaning that when one of the collector return lines is connected to the main pressure line, it is particularly preferential for the associated distributor pressure line to be disconnected from the main pressure line. If, for example, the first collector return line is connected to the main pressure line in the second operating state, it is particularly preferential for the first distributor pressure line to be disconnected from the main pressure line. On the other hand, if, for example, the second collector return line is hydraulically connected to the main pressure line in the second operating state, it is particularly preferential for the second distributor pressure line to be disconnected from the main pressure line.

In a further advantageous embodiment of an inventive hydraulic circuit, the hydraulic circuit is configured such that the respective other collector return line which is not connected to the main pressure line in the second operating state is connected to the main return line, wherein preferably its associated distributor pressure line is hydraulically connected to the main pressure line. In other words, meaning that when the hydraulic circuit is in the second operating state in which one of the collector return lines is hydraulically connected to the main pressure line, the other collector return line is in this case, analogous to the first operating state, preferentially connected to or remains connected to the main return line, and in particular the distributor pressure line associated with the collector return line hydraulically connected to the main return line is or remains hydraulically connected to the main pressure line. The part circuit, its collector return line not being hydraulically connected to the main pressure line, can thereby also continue to operate quasi "normally" in the second operating state providing no malfunction occurs in the circuit or, respectively, the malfunction which makes operation in the second operating state necessary does not occur in said part circuit such that the clutch associated with said part circuit can preferably be controlled as normal.

In a further advantageous embodiment of an inventive hydraulic circuit, the hydraulic circuit is configured such that in the second operating state, the clutch assigned to the part circuit, its collector return line connected to the main pressure line, is connected to the collector return line. This can thereby ensure that the applied working pressure in the collector return line also acts on the associated clutch so that the clutch opens upon sufficient working pressure in the relevant collector return line.

In a further advantageous embodiment of an inventive hydraulic circuit, the hydraulic circuit comprises a valve device, in particular a valve device able to be switched between at least two switching states, wherein preferably the valve device couples the distributor pressure line and the collector return line of the first part circuit and/or the distributor pressure line and the collector return line of the second part circuit to the main pressure line and to the main return line. Preferably, the hydraulic circuit is configured such that switching the valve device from one switching state to the other effects a change in operating state, in particular from a first operating state to a second operating state and vice versa.

Preferentially, the valve device is thereby arranged between the main lines; i.e. between the main pressure line and the main return line, as well as the distributor pressure line and the collector return line of the first part circuit and/or between the main lines as well as the distributor pressure line and the collector return line of the second part circuit. This thereby enables particularly easy switching between the first operating state and the second operating state to be realized.

If only one of the two distributor pressure lines with its associated collector return line is coupled to the main pressure line and the main return line by the valve device, the other distributor pressure line preferably bypasses the valve device and is in particular hydraulically connected/ connectable directly to the main pressure line, and the associated collector return line, which preferably likewise bypasses the valve device, is preferentially hydraulically connected or hydraulically connectable to the main return line.

That means that when only one of the two distributor pressure lines as well as associated collector return line, for example the first distributor pressure line and the first collector return line, is controlled via the valve device, the valve device preferentially connects the associated first collector return line hydraulically to the main pressure line and, particularly preferentially, the valve device hydraulically disconnects the first distributor pressure line from the main pressure line in the second operating state, particularly when the second operating state represents a fault mode.

Correspondingly in the opposite case, when only the second distributor pressure line and the second collector return line are controlled by the valve device, preferably the second collector return line is hydraulically connected to the main pressure line and the second distributor pressure line is hydraulically disconnected from the main pressure line in the second operating state.

Further particularly preferential is for the clutch actuator valve associated with the part circuit, its collector return line hydraulically connected to the main pressure line, to be switched such that the collector return line hydraulically connected to the main pressure line is hydraulically connected to the respective clutch so that, providing the working pressure is high enough, a working pressure applied in the collector return line effects an opening of the clutch.

Doing so can thus ensure that a clutch always opens in the second operating state; yet on the other hand, only one clutch. Then because a sufficient working pressure can be provided in the part circuit, the collector return line of which is not hydraulically connected to the main pressure line in the second operating state at the respective clutch of said part circuit and all the required valves functionally controlled, this clutch can be selectively closed. If, on the other hand, there is also a malfunction in the part circuit, the collector return line of which is not hydraulically connected to the main pressure line in the second operating state, and not enough working pressure can for example be provided, the clutch closes automatically due to its design as a "normally closed" clutch.

In a further advantageous embodiment of an inventive hydraulic circuit, the hydraulic circuit, in particular the valve device, is configured such that in at least one switching state of the valve device, either the first collector return line or the second collector return line is connected to the main pressure line, wherein preferably the associated distributor pressure line is hydraulically disconnected from the main pressure line and in particular the respective other distributor pressure line is hydraulically connected to the main pressure line and preferably the respective other collector return line is hydraulically connected to the main return line.

In other words, if both the first distributor pressure line and the first collector return line as well as the second distributor pressure line and the second collector return line are controlled via the valve device, is in the second operating state in contrast preferably either the first collector return line or the second collector return line hydraulically connected to the main pressure line and the associated distributor pressure line hydraulically disconnected from the main pressure line, wherein which of the collector return lines is connected to the main pressure line and which associated distributor pressure line is disconnected from the main pressure line particularly preferentially depends on the switching state of the valve device.

It can thus also be ensured that in the second operating state a respective clutch will open when both distributor pressure lines and both collector return lines are controlled by the valve device; yet on the other hand, only one clutch. Then, in the part circuit of which the collector return line is not hydraulically connected to the main pressure line in the second operating state, if a sufficient working pressure can be provided at the respective clutch of said part circuit and all the required valves can functionally be controlled, this clutch can be selectively closed. If, on the other hand, there is also a malfunction in the part circuit, the collector return line of which is not hydraulically connected to the main pressure line in the second operating state, and not enough working pressure can for example be provided, the clutch closes automatically due to its design as a "normally closed" clutch.

In a further advantageous embodiment of an inventive hydraulic circuit, the hydraulic circuit, in particular the valve device, is configured such that in at least one further switching state of the valve device, the distributor pressure lines coupled to the main pressure line by the valve device each are connected to the main pressure line and the collector return lines coupled to the main return line by the valve device each are connected to the main return line.

With the valve device or respectively hydraulic circuit configured as such, it can thus be readily ensured that in the first operating state, the distributor pressure lines controlled by the valve device each are hydraulically connected to the main pressure line and the collector return lines controlled by the valve device each are connected to the main return line so that the hydraulic circuit can be operated in the first operating state, in particular a "normal" operating state.

In a further advantageous embodiment of an inventive hydraulic circuit, the valve device comprises a first hydraulic switching valve, which is switchable at least between a first switching state and a second switching state, wherein the first hydraulic switching valve is preferably a 4/2-way valve and comprises a first inlet connection, a second inlet connection, a first outlet connection and a second outlet connection. Electromagnetically actuable 4/2-way valves with return spring have proven particularly suitable in this case.

In a further advantageous embodiment of an inventive hydraulic circuit, the first inlet connection of the first hydraulic switching valve is hydraulically coupled to the main return line and the second inlet connection to the main pressure line, wherein preferably the first outlet connection of the first hydraulic switching valve is hydraulically coupled to either the first distributor pressure line or to the second distributor pressure line and the second outlet connection is hydraulically coupled to the associated collector return line.

Particularly preferentially, the first inlet connection of the first hydraulic switching valve is thereby hydraulically connected to the main return line and the second inlet connection to the main pressure line, wherein the first outlet connection is preferably hydraulically connected either to the first distributor pressure line or to the second distributor pressure line and the second outlet connection particularly to the associated collector return line. It is of course also possible for the respective lines each to only be hydraulically coupled to the connections and the lines hydraulically connectable via a further intermediary hydraulic switching valve.

The first hydraulic switching valve preferentially acts as a type of "safety valve" enabling switching between the first operating state, in which the distributor pressure lines controlled by the valve device are hydraulically connected to the main pressure line and the collector return lines controlled by the valve device to the main return line, and the second operating state, in which one of the collector return lines controlled by the valve device is hydraulically connected to the main return line and the associated distributor pressure line disconnected from the main pressure line.

In a further advantageous embodiment of an inventive hydraulic circuit, the first hydraulic switching valve is configured such that in the first switching state of the first hydraulic switching valve, the first inlet connection is hydraulically connected to the second outlet connection and the second inlet connection to the first outlet connection, wherein preferably in the second switching state of the first hydraulic switching valve, the first inlet connection is blocked and the second inlet connection is hydraulically connected to the second outlet connection. In the non-actuated state, the first hydraulic switching valve is in particular in the second switching state. This thereby enables achieving one of the clutches opening even in case of a failure of the first hydraulic switching valve and thus being able to achieve the safe state.

If the valve device consists of the first hydraulic switching valve, the valve device is preferentially in the first switching state when the first hydraulic switching valve is non-actuated; i.e. it is in the second switching state, wherein the hydraulic circuit is thereby preferably in the second operating state, which is preferably a fault mode.

Particularly preferentially, the valve device is accordingly in the second switching state when the first hydraulic switching valve is actuated; i.e. it is in the first switching state, wherein the hydraulic circuit is particularly preferentially in the first operating state in this case, which is preferably the normal operating state.

In a further advantageous embodiment of an inventive hydraulic circuit, the first distributor pressure line and the second distributor pressure line are hydraulically coupled to the main pressure line via the valve device, in particular each hydraulically connectable to the main pressure line. The first collector return line and the second collector return line are preferably likewise hydraulically coupled to the main pressure line via the valve device as well as to the main return line, wherein the valve device is preferably switchable between at least three switching states, particularly between four switching states.

The hydraulic circuit is thereby preferably configured such that in a first switching state of the valve device, the first collector return line is hydraulically connected to the main pressure line and in a third switching state of the valve device, the second collector return line is hydraulically connected to the main pressure line, wherein preferably at least in a second switching state of the valve device, the distributor pressure lines coupled by the valve device to the main pressure line are each hydraulically connected to the main pressure line and the collector return lines coupled by the valve device to the main return line are each hydraulically connected to the main return line.

In other words, meaning that the valve device is preferentially configured such that in at least two switching states of the valve device, namely in particular in the first switching state and the third switching state, the hydraulic circuit is in the second operating state, which in particular represents a fault mode, and at least in the second switching state of the valve device, preferably additionally in a fourth switching state, the hydraulic circuit is in the first operating state, which is preferably the normal operating state.

In a further advantageous embodiment of an inventive hydraulic circuit, the valve device comprises a second hydraulic switching valve which is switchable between at least a first switching state and a second switching state, wherein the second hydraulic switching valve is preferably a reversing valve, in particular a 8/2-way valve, which is preferably composed of two 4/2-way valves coupled together and in particular comprises a total of four inlet connections and four outlet connections. The second hydraulic switching valve is preferably electromagnetically actuable, wherein in a non-actuated, i.e. unpowered state, it in particular remains in its last valve state, i.e. it is locked in said state.

In a further advantageous embodiment of an inventive hydraulic circuit, a first inlet connection of the second hydraulic switching valve is hydraulically coupled, in particular hydraulically connected, to the main pressure line, a second inlet connection of the second hydraulic switching valve to the first outlet connection of the first hydraulic switching valve, a third inlet connection of the second hydraulic switching valve to the main return line, a fourth inlet connection of the second hydraulic switching valve to the second outlet connection of the first hydraulic switching valve, a first outlet connection of the second hydraulic switching valve to the first distributor pressure line, a second outlet connection of the second hydraulic switching valve to the second distributor pressure line, a third outlet connection of the second hydraulic switching valve to the first collector return line, and a fourth outlet connection of the second hydraulic switching valve to the second collector return line.

In a further advantageous embodiment of an inventive hydraulic circuit, the second hydraulic switching valve is configured such that in the first switching state of the second hydraulic switching valve, the first inlet connection of the second hydraulic switching valve is hydraulically connected to the second outlet connection of the second hydraulic switching valve. The second inlet connection of the second hydraulic switching valve is thereby preferably hydraulically connected to the first outlet connection of the second hydraulic switching valve and the third inlet connection of the second hydraulic switching valve is thereby preferably hydraulically connected to the fourth outlet connection of the second hydraulic switching valve. The fourth inlet connection of the second hydraulic switching valve is preferably thereby further hydraulically connected to the third outlet connection of the second hydraulic switching valve.

In the second switching state of the second hydraulic switching valve, however, the first inlet connection of the second hydraulic switching valve is preferably hydraulically connected to the first outlet connection of the second hydraulic switching valve, the second inlet connection of the second hydraulic switching valve to the second outlet connection of the second hydraulic switching valve, the third inlet connection of the second hydraulic switching valve to the third outlet connection of the second hydraulic switching valve, and the fourth inlet connection of the second hydraulic switching valve to the fourth outlet connection of the second hydraulic switching valve.

A valve device having a first hydraulic switching valve as described above and a second hydraulic switching valve as described above enables easily switching between the individual switching states of the valve device and thus the operating states of the hydraulic circuit, wherein switching between the first switching state of the valve device and the third switching state of the valve device or respectively between the second switching state of the valve device and the fourth switching state of the valve device can be realized or effected by a reversing of the second hydraulic switching valve acting as a reversing valve, while switching from the first operating state into the second first operating state; i.e. preferably from the normal operating state to the fault mode, can be effected by reversing the first hydraulic switching valve.

A valve device configured in this way, in particular with a first hydraulic switching valve as described above and a second hydraulic switching valve as described above, wherein both distributor pressure lines as well as both collector return lines are controlled by the valve device, enables the selective and specific hydraulic connecting of the first collector return line or the second collector return line to the main pressure line so that either the first clutch or the second clutch can be selectively and specifically opened, particularly in the event of a malfunction.

As a result, it becomes possible to selectively open the first clutch or the second clutch, depending on the respective situation, whereby the safety of the hydraulic circuit, in particular the safety of a system controlled by the hydraulic circuit respectively, in particular a torque transmission device and/or a vehicle having such a torque transmission device, can be even further increased. Because with an inventive hydraulic circuit configured as such, either the first clutch or the second clutch can be opened in case of malfunction, depending on the driving state, so that the safer option can in each case be selected.

In a further advantageous embodiment of an inventive hydraulic circuit, the hydraulic circuit comprises one or more hydraulically actuable actuator assemblies configured as switching groups, wherein preferably each of the switching groups is assigned to either the first part circuit and hydraulically coupled to the first distributor pressure line as well as the first collector return line or assigned to the second part circuit and hydraulically coupled to the second distributor pressure line as well as the second collector return line, wherein if a plurality of switching groups is provided, particularly at least one switching group is assigned to the first part circuit and at least one switching group to the second part circuit.

Assigning the individual switching groups to different part circuits can even further improve the safety of a torque transmission device having an inventive hydraulic circuit for controlling the individual actuator assemblies since, depending on the respective driving conditions, as a result of or due to the assigning to the individual part circuits, the collector return line of that part circuit is hydraulically connected to the main pressure line by the valve device being in each case switched into the respectively required switching state, of which the subjecting of the collector return line to the working pressure applied in the main pressure line leads to a safer state compared to the subjecting of the collector return line of the other part circuit.

It is of course also possible to hydraulically connect or couple individual switching groups directly to the main lines or respectively to provide separate individual return lines to the return reservoir or to form further part circuits.

In a further advantageous embodiment of an inventive hydraulic circuit, the hydraulic circuit comprises a control device having a fault detection device, wherein the control device is thereby preferably configured to switch the hydraulic circuit into the second operating state when the fault detection device detects a defined malfunction.

Preferably, the fault detection device can thereby in particular recognize whether one of the clutch actuator valves or the valves for actuating the individual switching groups is defective, has a loss of pressure in the distributor pressure line, for example due to a leak, or in one of the individual pressure lines.

In a further advantageous embodiment of an inventive hydraulic circuit, the control device is configured to control the valve device such that the valve device switches either into the first switching state or the third switching state, particularly when a defined malfunction is detected.

By the valve device switching into the first or third switching state, preferably one of the two collector return lines is hydraulically connected to the main pressure line so that a working pressure present in the main pressure line will be transmitted to the collector return line, whereby the respectively associated clutch is opened so as to achieve a safe state. Preferentially, the associated clutch valve is thereby switched such that the clutch is opened by the working pressure applied to the collector return line.

A torque transmission device according to the invention, in particular an inventive torque transmission device configured for a vehicle, which comprises a hydraulically actuable dual-clutch with hydraulic circuit, is characterized in that the torque transmission device comprises a hydraulic circuit according to the invention.

A vehicle according to the invention is characterized in that it comprises an inventive torque transmission device.

A method according to the invention for operating an inventive hydraulic circuit having a control device comprising a fault detection device, and wherein the control device is configured to control the valve device such that the valve device switches either into the first switching state or into the third switching state, is characterized in that the fault detection device in a first step checks whether a defined malfunction is present and, in a second step when a defined malfunction is detected, the hydraulic circuit is switched into the second operating state, in which case the valve device is preferably switched either to the first or to the third switching state.

Meaning, in other words, that an inventive hydraulic circuit is inventively operated by the valve device being switched into the first or the third switching state in case of a malfunction, whereby the hydraulic circuit is operated in the second operating state in which one of the collector return lines is hydraulically connected to the main pressure line so that a working pressure present in the main pressure line will be transmitted to the collector return line, whereby in turn one of the two clutches is opened provided the associated clutch actuator valve is likewise in a corresponding switching state.

An inventive method for operating an inventive vehicle is characterized in that in a first step the fault detection device checks whether a defined malfunction is present in the hydraulic circuit and in a second step, when a defined malfunction is detected, the hydraulic circuit is switched into the second operating state, in which case the valve device is preferably switched either to the first or to the third switching state.

Meaning, in other words, that the hydraulic circuit in a vehicle is inventively switched into the second operating state in the event of a malfunction, particularly in order to achieve a safe state, by the valve device preferably being switched into the first or third switching state in which in particular one of the collector return lines is hydraulically connected to the main pressure line, whereby the opening of one of the two clutches is effected provided any clutch actuator valve provided is preferentially likewise in a corresponding switching state.

An advantageous implementation of a method according to the invention for operating an inventive vehicle, wherein the vehicle comprises a driving state detection device, is characterized in that a driving state is additionally detected by means of the driving state detection device, wherein if a defined malfunction is detected, the valve device of the torque transmission device is switched to either the first or the third switching state as a function of the detected driving state, depending on which switching state of the valve device results in a safer vehicle state.

These and further features are apparent from the claims and from the description as well as the drawings, wherein the individual features can in each case be realized alone or in subgroup combinations in an embodiment of the invention and can constitute an advantageous as well as patentable implementation in its own right for which protection is likewise sought provided same is technically feasible.

Some of the features and/or properties referred to in the following relate both to a hydraulic circuit according to the invention as well as also to a torque transmission device according to the invention, a vehicle according to the invention and a method according to the invention. Some of the features and properties are only described once yet apply independently of each another in the context of technically feasible embodiments of either an inventive hydraulic circuit, an inventive torque transmission device, an inventive vehicle or also an inventive method.

Figure 2:
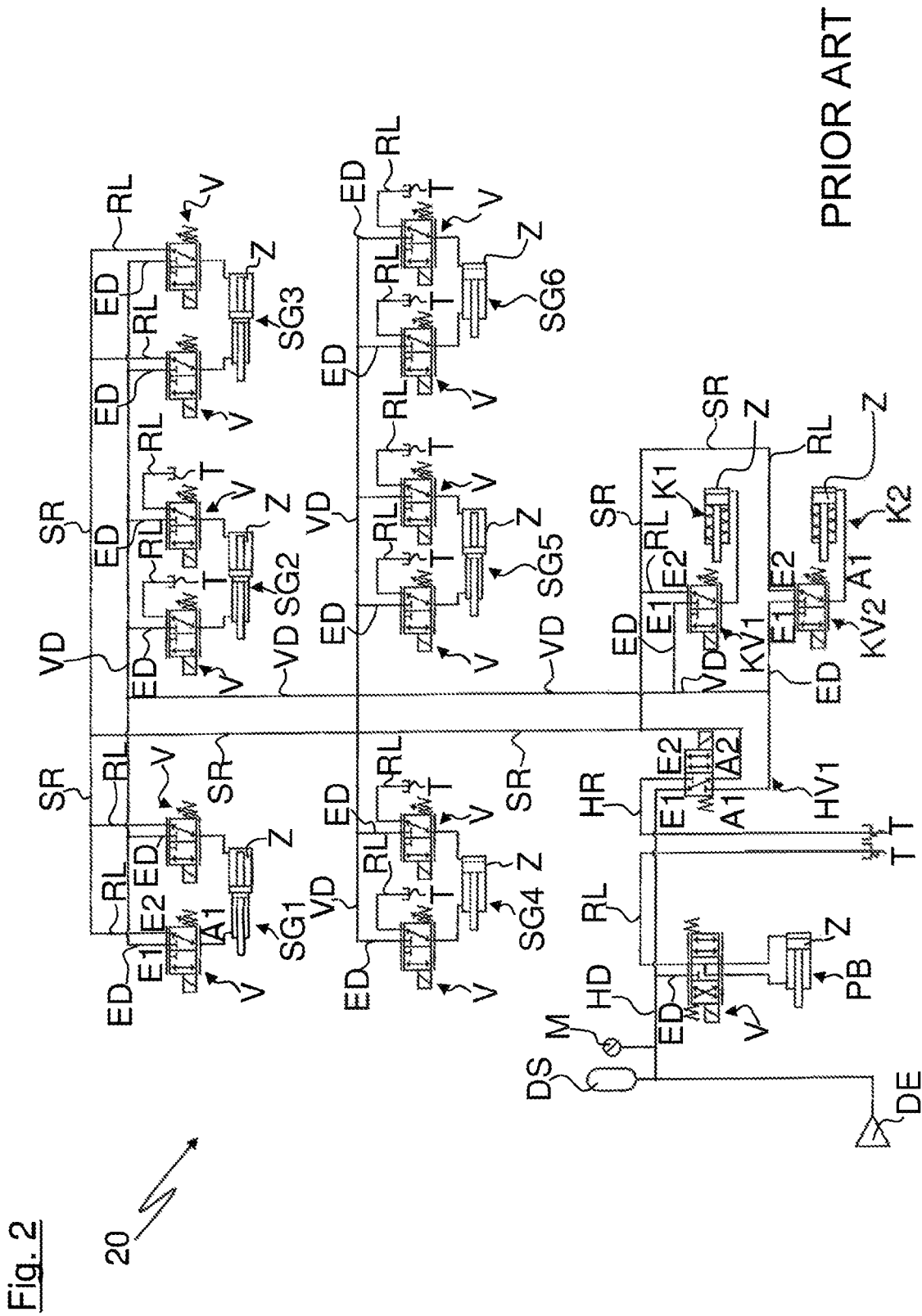
Figure 3:
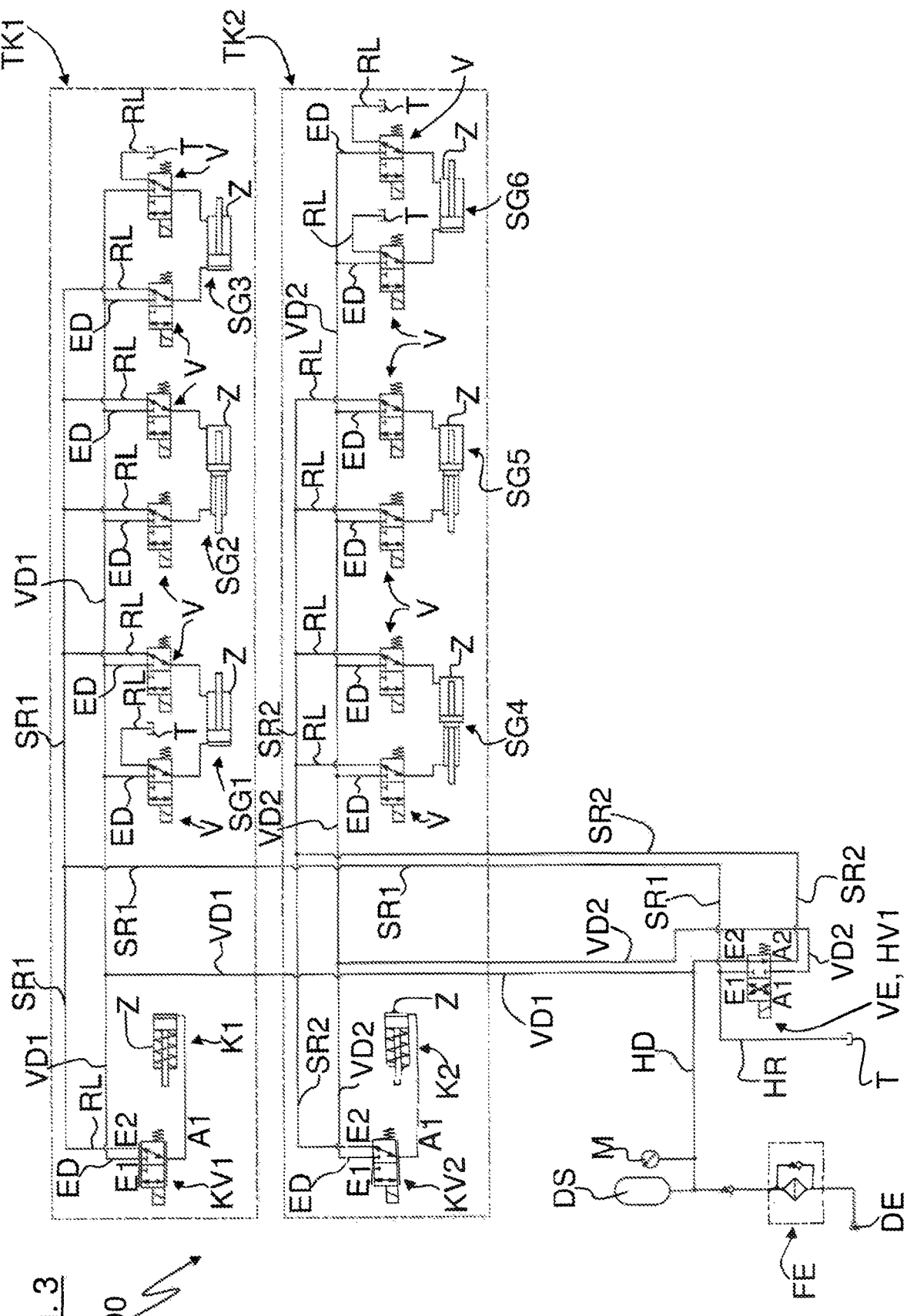
Figure 4:
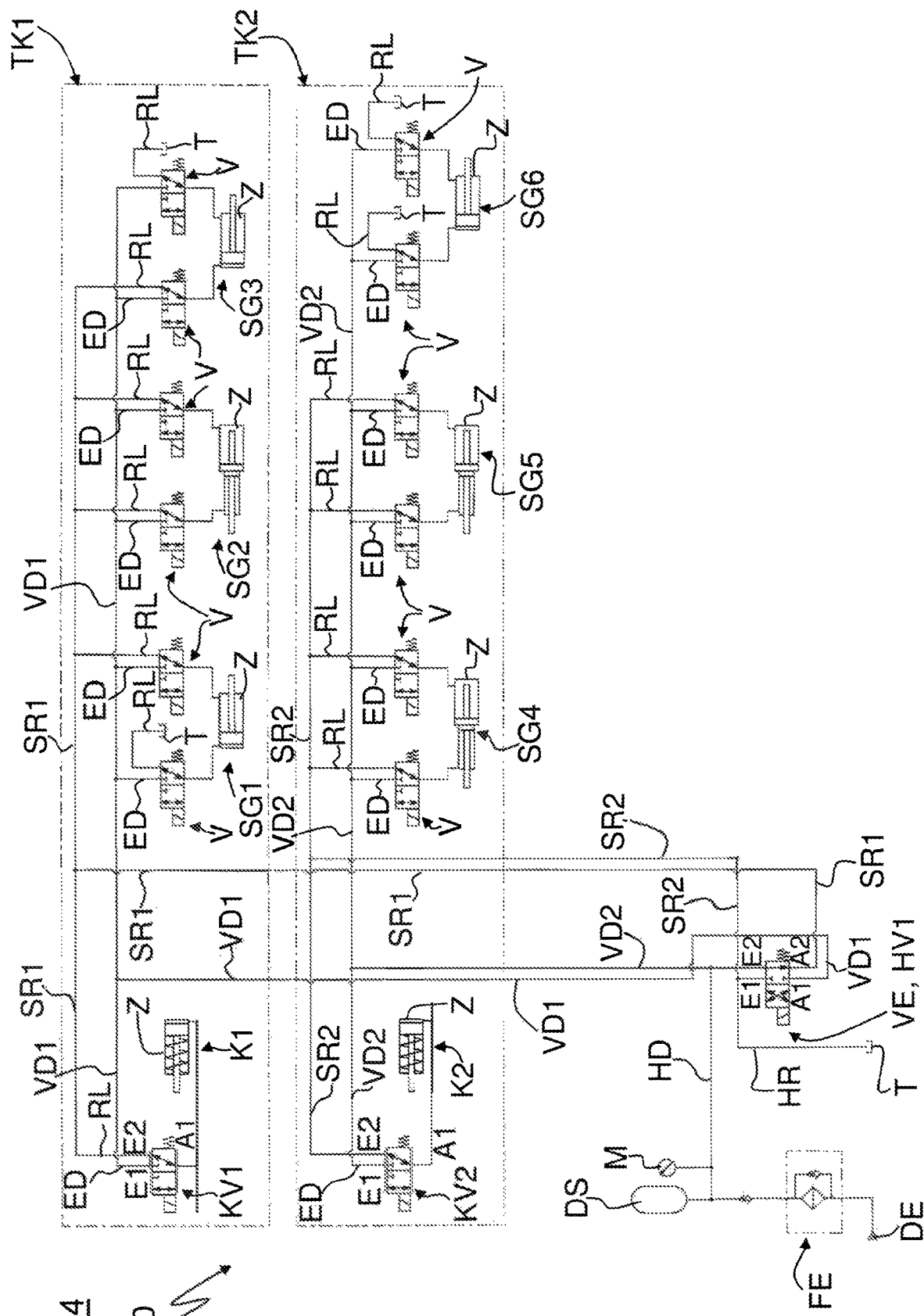
Figure 5:
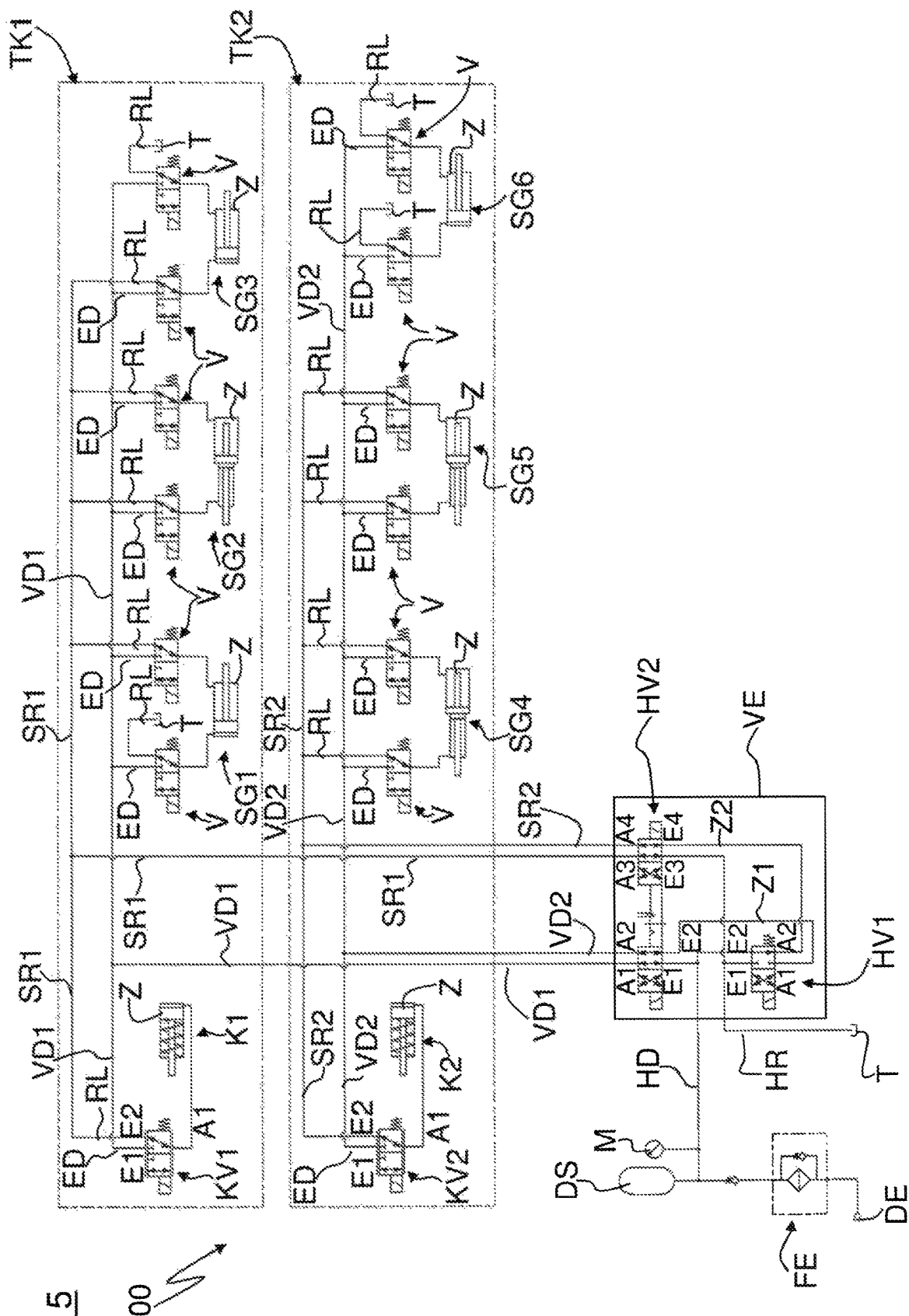

The following will draw on three example embodiments in further explaining the invention, wherein the invention is schematically depicted thereto in the accompanying drawings. Thereby shown are:

FIG. 1 a known prior art hydraulic circuit for controlling a torque transmission device configured as a dual-clutch transmission for a vehicle, FIG. 2 a further known prior art hydraulic circuit for controlling a torque transmission device configured as a dual-clutch transmission for a vehicle, FIG. 3 a first example of an embodiment of an inventive hydraulic circuit for controlling a torque transmission device configured as a dual-clutch transmission for a vehicle, FIG. 4 a second example of an embodiment of an inventive hydraulic circuit for controlling a torque transmission device configured as a dual-clutch transmission for a vehicle, and FIG. 5 a third example of an embodiment of an inventive hydraulic circuit for controlling a torque transmission device configured as a dual-clutch transmission for a vehicle.

To assist in the understanding of the invention, a hydraulic circuit 10 as known from the prior art for controlling a torque transmission device configured as a dual-clutch transmission for a vehicle is depicted in FIG. 1, wherein the dual-clutch transmission comprises a first hydraulically actuable clutch K1, a second hydraulically actuable clutch K2 and a total of six respectively likewise hydraulically actuable actuator assemblies configured as switching groups SG1-SG6, wherein the hydraulic circuit 10 is in particular configured to control or respectively actuate the two clutches K1 and K2 as well as the individual switching groups SG1-SG6.

To generate a working pressure, the hydraulic circuit 10 comprises a pressure generating device DE as well as a pressure accumulator DS, via which a hydraulic medium located in a main pressure line HD can be pressurized to the required working pressure. A working pressure in the main pressure line HD can be detected by a pressure detection device M, which in the simplest case is formed by a manometer M. A filter device FE is then also provided in this example embodiment in the branch of the line between the pressure generating device DE and the pressure accumulator DS.

Both clutches K1 and K2 as well as switching groups SG1-SG6 can be supplied with the hydraulic medium subjected to the working pressure via main pressure line HD, wherein the hydraulic supply of the two clutches K1 and K2 thereby occurs via the respective main pressure line HD as well as via respective individual pressure lines ED branching from the main pressure line HD, wherein each of the clutches K1 respectively K2 is assigned to a separate individual pressure line ED.

The first clutch K1 is thereby configured as a so-called "normally closed" clutch which in an unloaded state; i.e. in a state in which the corresponding working chamber in actuator cylinder Z is not subjected to sufficient working pressure, is closed due to the restoring forces of a return spring fit into the actuator cylinder Z. The second clutch K2 on the other hand is configured as a "normally open" clutch which in an unloaded state, i.e. in a state of not being subjected to sufficient working pressure, is open due to the acting restoring forces.

Thus, in the event of a malfunction, such as for example as occurs with a loss in pressure in one of the individual pressure lines ED via which the two clutches K1 and K2 are hydraulically coupled to the main pressure line HD or upon failure of a not shown but provided control device, by means of which the individual valves V or KV1 and KV2 respectively are controlled, it is in each case always ensured that a clutch is open. However, whether tractive force is maintained or completely disengaged upon malfunction depends on the respective current operating state of the "normally closed" clutch K1.

Switching groups SG1-SG6 are likewise supplied with the hydraulic medium subjected to the working pressure via the main pressure line HD as well as additionally via a distributor pressure line VD branching from the main pressure line, wherein each of the switching groups SG1-SG6 is hydraulically coupled to the distributor pressure line VD via respectively separate individual pressure lines ED.

All of the actuator assemblies; i.e. both the two clutches K1 and K2 as well as all of the switching groups SG1-SG6, are thereby each coupled to the associated individual pressure line ED via a switchable hydraulic valve V, or the two clutches each via a clutch actuator valve KV1 or KV2 respectively, wherein the individual actuator assemblies each comprise a symbolically represented, hydraulically actuable actuator cylinder Z as an actuating element.

Each of the respective actuator assemblies K1, K2 and SG1-SG6 can be subjected to the working pressure produced by the pressure generating device and/or the pressure accumulator DS via the main pressure line HD as well as the distributor pressure lines VD and the individual pressure lines ED. Depending on the switch position of the associated valves V or KV1 and KV2 respectively as well as on the applied working pressure, actuation of the associated actuator cylinder Z will or will not ensue.

All of the hydraulic switching valves V or KV1 and KV2 respectively of this hydraulic circuit 10 are configured as 3/2-way valves with electromagnetic actuation and a return spring, wherein a first inlet connection E1, which for the sake of clarity is only designated with respect to the two clutch actuator valves KV1 and KV2 and valve V of switching groups SG3, is always connected to the associated individual pressure line ED via which the associated actuator assembly can be subjected to the working pressure present in the hydraulic circuit 10. A second inlet connection E2 is in each case connected via a separate individual return line RL assigned to the respective actuator assembly to a return reservoir T which serves as a common reservoir for the hydraulic medium and from which the pressure generating device DE, configured as a pump, can draw the hydraulic medium.

The respective sole outlet connection A1 of valves V or KV1 and KV2 is each hydraulically connected to the associated actuator cylinder Z of the respective actuator assembly K1, K2 respectively SG1-SG6 so that the movable piston in the actuator cylinder Z can in each case be acted upon by the working pressure when the associated valve V or KV1 or KV2 respectively is in an appropriate switching state.

In FIG. 1, the hydraulic switching valves V or KV1 and KV2 respectively are depicted in a non-actuated switching state in which the respective first inlet connection E1 is blocked and the respective second inlet connection E2 is hydraulically connected to the outlet connection A1. In this switching state, the hydraulic medium can be discharged from the working chamber of the actuator cylinder Z via the respectively associated individual return line RL into reservoir T, wherein the pressure in the actuator cylinder Z can be reduced.

In contrast, when valves V or KV1 and KV2 respectively of one or more actuator assemblies are in a not shown actuated state, the respective first inlet connection E1 is connected through to the first outlet connection A1 i.e. hydraulically connected to the first outlet connection A1, so that the actuator cylinders Z are respectively subjected to the working pressure present in the main pressure line HD and the distributor pressure lines VD as well as the individual pressure lines ED and actuation of the respective actuator assemblies can be effected.

Yet due to using a "normally open" clutch K2, the known prior art hydraulic circuit 10 depicted in FIG. 1 has the disadvantage of always requiring energy to close clutch K2.

FIG. 2 shows a known prior art hydraulic circuit 20, known from the post-published AT 50771/2014. To aid in understanding, functionally identical components in FIG. 2 are thereby identified by the same reference numerals as in FIG. 1.

The hydraulic circuit 20 from FIG. 2 likewise comprises, as does the hydraulic circuit 10 described above on the basis of FIG. 1, a first clutch K1, a second clutch K2, a pressure generating device DE in the form of a pump as well as a pressure accumulator DS via which a hydraulic medium conducted in the main pressure line HD can be pressurized to a working pressure. A pressure detection device M in the form of a manometer for detecting the working pressure in the main pressure line HD is likewise provided.

The two clutches K1 and K2 are each likewise hydraulically coupled to an associated individual pressure line ED via an associated clutch actuator valve KV1 respectively KV2.

This hydraulic circuit 20 also comprises several switching groups SG1-SG6 which, however, are arranged slightly differently compared to the hydraulic circuit 10 from FIG. 1. The individual switching groups SG1-SG6 are thereby likewise respectively hydraulically coupled to a distributor pressure line VD via corresponding hydraulic switching valves V and a respective associated individual pressure line ED.

Additionally to the hydraulic circuit 10 shown in FIG. 1, hydraulic circuit 20 also comprises a further actuator assembly PB in the form of a hydraulically actuable parking brake which is coupled to the main pressure line HD via a hydraulic switching valve V' as well as a corresponding individual pressure line ED.

The valves V or KV1 and KV2 respectively assigned to the two clutches K1, K2 and the six switching groups SG1-SG6 are thereby likewise, as in FIG. 1, configured as 3/2-way valves electromagnetically actuable having a return spring. Only actuator assembly PB; i.e. the parking brake, is coupled to the main pressure line HD as well as an associated individual return line RL by a 4/3 proportional way valve.

In contrast to the previously described hydraulic circuit 10, hydraulic circuit 20 depicted in FIG. 2 comprises two "normally closed" clutches K1 and K2 and as a necessary additional safety precaution to prevent simultaneous closing of both clutches K1 and K2 in the event of a malfunction, a hydraulic switching valve HV1 arranged between the main pressure line HD and the distributor pressure line VD, via which the two clutches K1 and K2 together with the associated individual pressure lines ED are supplied.

A further substantial difference is that the individual return lines RL of the first clutch K1 and the second clutch K2 as well as the individual return lines RL of switching group SG1 and switching group SG3 are respectively joined in the hydraulic circuit 20 of FIG. 2 into a common collector return line SR and that the individual pressure lines ED of the two clutches K1 and K2 do not branch off directly from the main pressure line HD but rather from the distributor pressure line VD, wherein the distributor pressure line VD and the collector return line SR are hydraulically coupled to the main pressure line HD as well as the main return line HR via the first hydraulic switching valve HV1.

The first hydraulic switching valve HV1, via which the distributor pressure line VD and the collector return line SR are hydraulically coupled to the main pressure line HD or the main return line HR respectively, is configured as a 4/2-way valve which is likewise electromagnetically actuable and likewise comprises a return spring in order to assume a defined switch position in a non-actuated state.

The first inlet connection E1 of the first hydraulic switching valve HV1 is thereby hydraulically connected to the main pressure line HD, the second inlet connection E2 to the main return line HR, the first outlet connection A1 to the distributor pressure line VD and the second outlet connection A2 to the collector return line SR.

The hydraulic switching valve HV1 is configured so that in a non-actuated, i.e. non-energized state, the first inlet connection E1 is hydraulically connected to the second output connection A2 such that a working pressure in the main pressure line HD will be transmitted to the collector return line RL. With corresponding switch position of valves V or respectively clutch actuator valves KV1 and KV2 of the associated actuator assemblies, their individual return lines RL being hydraulically connected to the collector return line SR, the respective actuator cylinders Z can be subjected to the pressure from the main pressure line HD via the collector return line SR, wherein the two clutches K1 and K2 can be opened at the same time provided the working pressure is greater than the restoring force of the spring elements.

Correspondingly, an actuating of switching groups SG1 and SG3, their individual return lines RL likewise being connected to collector return line SR, can be effected, wherein the torque transmission device can be brought into a safe state, in particular power flow to a combustion engine or the like mechanically coupled to the torque transmission device can be safely disconnected.

However, under certain driving situations or in certain vehicles respectively, for example in the case of particularly heavy vehicles such as construction vehicles, towing vehicles, etc., it can be undesirable, or in some countries even prohibited, for both clutches K1 and K2 to open at the same time in the event of a malfunction and the power flow to a drive motor thus be completely disconnected. A hydraulic circuit according to the invention can avoid this disadvantage, even with two "normally closed" clutches, as will be explained in greater detail in the following on the basis of FIGS. 3 to 5, wherein FIG. 3 shows a first example of an embodiment of an inventive hydraulic circuit 100, FIG. 4 a second example of an embodiment of an inventive hydraulic circuit 200, and FIG. 5 a third example of an embodiment of an inventive hydraulic circuit 300.

In the examples of embodiments of an inventive hydraulic circuit 100 respectively 200 depicted in FIGS. 3 and 4, one of the two clutches K1 or K2 can respectively be opened in the event of a malfunction and the other clutch K2 or K1 closed, wherein it is continuously determined in the inventive hydraulic circuits 100 and 200 depicted in FIGS. 3 and 4 which of the two clutches K1, K2 opens upon a malfunction and which closes. Compared to the inventive hydraulic circuits 100 and 200 depicted in FIGS. 3 and 4, the inventive hydraulic circuit 300 depicted in FIG. 5 by way of example has the advantage of upon a malfunction either the first clutch K1 being able to be selectively opened, in particular as a function of a driving state, and the second clutch K2 closes or the first clutch K1 closes and the second clutch K2 is opened.

The hydraulic circuit 100 depicted in FIG. 3 likewise comprises, as in the hydraulic circuits 10 and 20 according to FIG. 1 and described above, a pressure generating device DE in the form of a pump as well as a pressure accumulator DS via which a hydraulic medium conducted in the main pressure line HD can be pressurized to a working pressure. A pressure detection device M in the form of a manometer for detecting the working pressure in the main pressure line HD is likewise provided. Furthermore, a first clutch K1 and a second clutch K2, each configured as "normally closed" clutches, are likewise provided and likewise respectively hydraulically coupled to an associated individual pressure line ED by an associated clutch actuator valve KV1 respectively KV2. Furthermore, this hydraulic circuit 100 likewise comprises a plurality of switching groups SG1-SG6, albeit these being arranged differently compared to the previously described hydraulic circuits 10 and 20 from FIGS. 1 and 2.

The inventive hydraulic circuit 100 likewise comprises a first hydraulic switching valve HV1 which in this case forms an inventive valve device VE. In contrast to the previously described hydraulic circuits 10 and 20 from FIGS. 1 and 2 as known from the prior art, the inventive hydraulic circuit 100 comprises a first distributor pressure line VD1 as well as a second separate distributor pressure line VD2 able to be disconnected from the first distributor pressure line and a first collector return line SR1 as well as a second separate collector return line SR2 able to be disconnected from the first collector return line. The first distributor pressure line VD1 as well as the first collector return line SR1 are thereby assigned to a first part circuit TK1 and provided and configured to supply the hydraulic working pressure to the respective individual pressure lines ED of the components of the first part circuit TK1. Correspondingly, the second distributor pressure line VD2 and the second collector return line SR2 are provided for the hydraulic supplying of the second part circuit TK2.

Thereby the first clutch K1 as well as switching groups SG1 to SG3 are assigned to the first part circuit TK1 and to the second part circuit TK2 the second clutch K2 as well as switching groups SG4 to SG6. The connecting of the individual switching groups SG1-SG6 as well as of the first clutch K1 and the second clutch K2 is thereby analogous to that as in the previous hydraulic circuits 10 and 20 known from the prior art.

Of the individual switching groups SG1 to SG6, some individual switching groups comprise separate individual return lines RL which are hydraulically connected directly to the return reservoir T and are not connected via the collector return lines SR1 respectively SR2 and the main return line HR, in particular switching groups SG1, SG3 and SG6.

In this example of an embodiment, the first distributor pressure line VD1 is hydraulically connected directly to the main pressure line HD while the second distributor pressure line VD2 is controlled via the valve device VE or, in this case, via the first hydraulic switching valve HV1 forming the valve device VE respectively. The first collector return line SR1 is hydraulically connected directly to the main return line HR while the second collector return line SR2 is likewise controlled by the valve device VE in form of the first hydraulic switching valve HV1.

The first hydraulic switching valve HV1 is itself thereby of identical design to the first hydraulic switching valve HV1 of the hydraulic circuit 20 described on the basis of FIG. 2. In the inventive hydraulic circuit 100 depicted in FIG. 3, however, the first inlet connection E1 of the first hydraulic switching valve HV1 is connected to the main return line HR and the second inlet connection E2 to the main pressure line HD, the first outlet connection H1 to the second distributor pressure line VD2 and the second outlet connection A2 to the second collector return line SR2.

In a depicted second non-actuated state of the first hydraulic switching valve HV1, and thus in a first switching state of the valve device VE and in a second operating state of the hydraulic circuit, in particular in a fault mode, the first inlet connection E1 is blocked and the second inlet connection E2 of the first hydraulic switching valve HV1 is hydraulically connected to the second outlet connection A2 of the first hydraulic switching valve HV1, which in this case has as a consequence the main pressure line HD being hydraulically connected to the second collector return line SR2 so that a working pressure present in the main pressure line HD is also present in the second collector return line SR2. As a result, the second clutch K2 opens in the hydraulic circuit 100 depicted in FIG. 3, provided the associated clutch actuator valve KV2 is likewise in the non-actuated state, as is shown in FIG. 3. The second clutch K2 can thus be opened by switching the first hydraulic switching valve HV1 into the second switching state, or respectively by valve device VE into the first switching state, independently of the first clutch K1 which, provided there is no malfunction in part circuit TK1, can furthermore be selectively opened or closed depending on the control of the associated first clutch actuator valve KV1.

Thus, closing of both clutches K1 and K2 at the same time upon malfunction can be prevented without completely disconnecting the power flow to the drive motor, so that despite the use of two "normally closed" clutches K1 and K2, a safe state can also be achieved in the case of heavy vehicles. A hydraulic circuit 100 according to the invention with two "normally closed" clutches K1 and K2 thus enables a more energy-efficient operation compared to a hydraulic circuit with only one "normally closed" clutch and has the advantage over the hydraulic circuit 20 depicted in FIG. 2 known from prior art of one clutch always being able to be closed so that even heavy vehicles can be brought into a safe state.

In contrast, in a not shown first actuated state of the first hydraulic switching valve HV1, and thus in a second switching state of the valve device VE and in a first operating state of the hydraulic circuit 100, in particular in a normal operating state, the first inlet connection E1 is hydraulically connected to the second outlet connection A2 and the second inlet connection E2 to the first outlet connection E1. Thus, the second distributor pressure line VD is likewise connected to the main pressure line HD and the second collector return line SR likewise to the main return line HR, as is usual for a hydraulic circuit in normal operation, such that both clutches K1 and K2 can be subjected to the working pressure via the respective distributor pressure lines VD1, VD2 and the working pressure can respectively be reduced via collector return lines SR1 and SR2.

FIG. 4 shows a second example of an embodiment of an inventive hydraulic circuit 200, wherein this hydraulic circuit 200 only differs from the hydraulic circuit 300 described on the basis of FIG. 3 in that the valve device VE or the first hydraulic switching valve HV1 respectively is not controlling the second distributor pressure line VD2 and the second collector return line SR2 but rather the first distributor pressure line VD1 as well as the first collector return line SR1. Consequently, the first clutch K1 opens in the inventive hydraulic circuit 200 depicted in FIG. 4 in the event of a malfunction.

FIG. 5 shows a third example of an embodiment of an inventive hydraulic circuit 300 in which the valve device VE is not only formed by the first hydraulic switching valve HV1 but rather comprises a second hydraulic switching valve HV2, and wherein the valve device VE hydraulically couples both distributor pressure lines VD1 and VD2 as well as both collector return lines SR1 and SR2 to the main pressure line HD or main return line HR respectively.

The first hydraulic switching valve HV1 is thereby constructed identically to the previous first hydraulic switching valves of hydraulic circuits 20, 100 and 200 from FIGS. 2 to 4 likewise identified by HV1, wherein the first inlet connection E1 is likewise hydraulically connected to the main return line HR and the second inlet connection E2 likewise to the main pressure line HD as with the two previously described inventive hydraulic circuits 100 and 200. The two outlet connections A1 and A2 of the first hydraulic switching valve HV1, however, are not directly connected to one of the distributor pressure lines VD1 or VD2 or one of the collector return lines SR1 or SR2 respectively, but rather to an intermediary line Z1 respectively Z2 each, wherein the first intermediary line Z1 connects the first outlet connection A1 of the first hydraulic switching valve VH1 to the second inlet connection E2 of the second hydraulic switching valve HV2 and the second intermediary line Z2 connects the second outlet connection A2 to the fourth inlet connection E4 of the second hydraulic switching valve HV2.

The second hydraulic switching valve HV2 is thereby configured as an 8/2-way valve and acts as a reversing valve, wherein the second hydraulic switching valve HV2 has two-times two inlet connections E1 and E2 as well as E3 and E4 and two-times two outlet connections A1 and A2 as well as A3 and A4. The second hydraulic switching valve HV2 is thereby likewise electromagnetically actuable. In a non-actuated state, however, it is kept in its last respective switch position; i.e. it is lockable.

The first inlet connection E1 is hydraulically connected to the main pressure line HD and the third inlet connection E3 to the main return line HR. Outlet connections A1 and A2 are hydraulically connected to the first distributor pressure line VD1 or the second distributor pressure line VD2 respectively, the third outlet connection A3 to the first collector return line SR1 and the fourth outlet connection A4 to the second collector return line SR2.

In a first switching state of the second hydraulic switching valve HV2, as shown here in FIG. 5, the first inlet connection E1 is hydraulically connected to the first outlet connection A1, the second inlet connection E2 to the second outlet connection A2, the third inlet connection E3 to the third outlet connection A3, and the fourth inlet connection E4 to the fourth outlet connection A4.

In the second possible switching state of the second hydraulic switching valve HV2, however, the first inlet connection E2 is hydraulically connected to the second outlet connection A2, the second inlet connection E2 to the first outlet connection A1, the third inlet connection E3 to the fourth outlet connection A4, and the fourth inlet connection E4 to the third outlet connection A3.

The additional arrangement of a second hydraulic switching valve HV2 acting as a reversing valve in valve device VE enables the respective collector return line SR1 or SR2 respectively to be able to be selectively subjected to the working pressure present in the main pressure line HD in the event of a malfunction by the hydraulic connecting of the first collector return line SR1 or the second collector return line SR2 to the main pressure line HD and thus the clutch K1 respectively K2 associated with the respective collector return line SR1 respectively SR2 of the associated part circuit TK1 respectively TK2 to be opened.

The valve device VE is thereby particularly preferentially in the first or third switching state and the hydraulic circuit 300 in the second operating state, in particular in a fault mode, when the first hydraulic switching valve HV1 is in the second non-actuated switching state. Correspondingly, the valve device VE is particularly preferentially in the second or fourth switching state and the hydraulic circuit 300 in the first operating state, in particular in a normal operating state, when the first hydraulic switching valve HV1 is in the first actuated switching state.

A valve device VE having a first hydraulic switching valve HV1 as described above and a second hydraulic switching valve HV2 as described above thereby enables easily switching between the individual switching states of the valve device VE and thus the operating states of the hydraulic circuit 300, wherein the switching between the first switching state of the valve device VE and the third switching state of the valve device VE or respectively between the second switching state of the valve device VE and the fourth switching state of the valve device VE can be realized or respectively effected by a switching of the second hydraulic switching valve HV2 acting as a reversing valve while the switching from the first operating state into the second operating state; preferably from the normal operating state to the fault mode, can be effected by a switching of the first hydraulic switching valve HV1.

Accordingly, the switching groups SG1 to SG3 respectively SG4 to SG6, assigned to part circuit TK1 respectively TK2, of that part circuit whose clutch K1 respectively K2 opens upon malfunction, can likewise be brought into a safe state.

With such a hydraulic circuit 300 according to the invention can thus, in particular by virtue of the second hydraulic switching valve HV2 acting as a reversing valve which is additionally provided compared to the previously described inventive hydraulic circuits 100 and 200, by means of an associated correspondingly configured control device, for example in a vehicle as a function of the vehicle state, if same can be correspondingly detected and evaluated by the control device, in the event of a malfunction selectively either the first clutch K1 being opened and the second clutch K2 closed or the second clutch K2 being opened and the first clutch K closed selectively. The second hydraulic switching valve HV2 is thereto switched into the first or the second switching state and the first hydraulic switching valve HV1 into the respective second non-actuated state; i.e. as shown in FIG. 5.

Of course, a plurality of modifications of the described embodiments are possible without departing from the scope of the claims.

What claimed is:

1. A hydraulic circuit for a torque transmission device having a hydraulically actuable dual-clutch, comprising:
   a first hydraulically actuable clutch that is closed in a rest state;
   a second hydraulically actuable clutch that is closed in the rest state;
   a pressure generating device and/or a pressure accumulator;
   a main pressure line hydraulically coupled to the pressure generating device and/or the pressure accumulator;
   a first distributor pressure line hydraulically coupled to the main pressure line, the first distributor pressure line for a hydraulic supply of a first part circuit;
   a second distributor pressure line for a hydraulic supply of a second part circuit and that is hydraulically disconnectable from the first distributor pressure line, the second distributor pressure line being separate from the first distributor pressure line;
   a return reservoir;
   a main return line hydraulically coupled to the return reservoir;
   a first collector return line for the hydraulic supply of the first part circuit and hydraulically coupled to the main return line; and
   a second collector return line for the hydraulic supply of the second part circuit and that is hydraulically disconnectable from the first collector return line, the second collector return line being separate from the first collector return line;
   wherein the hydraulic circuit is configured such that a hydraulic medium present in the main pressure line can be loaded with a working pressure by the pressure generating device and/or the pressure accumulator, and the hydraulic medium can be discharged for pressure dissipation via the main return line into the return reservoir,
   wherein the hydraulic circuit can be operated in a first operating state and a second operating state and can be switched between the first operating state and the second operating state,
   wherein the first hydraulically actuable clutch is assigned to the first part circuit and can be hydraulically connected to the first distributor pressure line or the first collector return line,
   wherein the second hydraulically actuable clutch is assigned to the second part circuit and can be hydraulically connected to the second distributor pressure line or the second collector return line, and
   wherein the hydraulic circuit is configured such that either the first collector return line or the second collector return line is hydraulically connected to the main pressure line in the second operating state.

2. The hydraulic circuit according to claim 1, wherein the hydraulic circuit is configured such that in the first operating state, the first and second distributor pressure lines are each hydraulically connected to the main pressure line and the first and second collector return lines are each hydraulically connected to the main return line.

3. The hydraulic circuit according to claim 1, wherein the hydraulic circuit is configured such that in the second operating state, the associated first or second distributor pressure line is hydraulically disconnected from the main pressure line.

4. The hydraulic circuit according to claim 3, wherein the hydraulic circuit is configured such that the respective other collector return line which is not connected to the main pressure line in the second operating state is connected to the main return line.

5. The hydraulic circuit according to claim 1, wherein the hydraulic circuit is configured such that in the second operating state, the first or second hydraulically actuable clutch assigned to the respective part circuit is hydraulically connected to the respective collector return line, and the respective collector return line is connected to the main pressure line.

6. The hydraulic circuit according to claim 1, wherein the hydraulic circuit comprises a valve device, and wherein the valve device couples the first distributor pressure line and the first collector return line of the first part circuit and/or the second distributor pressure line and the second collector return line of the second part circuit to the main pressure line and the main return line.

7. The hydraulic circuit according claim 6, wherein the hydraulic circuit is configured such that in at least one switching state of the valve device, either the first collector return line or the second collector return line is connected to the main pressure line, and wherein the associated distributor pressure line is hydraulically disconnected from the main pressure line and the respective other distributor pressure line is hydraulically connected to the main pressure line and the respective other collector return line is hydraulically connected to the main return line.

8. The hydraulic circuit according claim 7, wherein the hydraulic circuit is configured such that in at least one further switching state of the valve device, the first and second distributor pressure lines coupled to the main pressure line by the valve device each are hydraulically connected to the main pressure line and the first and second collector return lines coupled to the main return line by the valve device each are hydraulically connected to the main return line.

9. The hydraulic circuit according to claim 6, wherein the valve device comprises a first hydraulic switching valve, that is switchable at least between a first switching state and a second switching state, and wherein the first hydraulic switching valve is a 4/2-way valve and comprises a first inlet connection, a second inlet connection, a first outlet connection, and a second outlet connection.

10. The hydraulic circuit according to claim 9, wherein the first inlet connection of the first hydraulic switching valve is hydraulically coupled to the main return line and the second inlet connection is hydraulically coupled to the main pressure line, and wherein the first outlet connection of the first hydraulic switching valve is hydraulically coupled to either the first distributor pressure line or the second distributor pressure line and the second outlet connection is hydraulically coupled to the associated collector return line.

11. The hydraulic circuit according to claim 9, wherein the first hydraulic switching valve is configured such that in the first switching state of the first hydraulic switching valve, the first inlet connection is hydraulically connected to the second outlet connection and the second inlet connection is hydraulically connected to the first outlet connection, wherein in the second switching state of the first hydraulic switching valve, the first inlet connection is blocked and the second inlet connection is hydraulically connected to the second outlet connection, and wherein the first hydraulic switching valve is in the non-actuated state in the second switching state.

12. The hydraulic circuit according to claim 6, wherein the first distributor pressure line and the second distributor pressure line are coupled to the main pressure line via the valve device, wherein the first collector return line and the second collector return line are coupled to the main return line via the valve device, wherein the valve device is switchable between at least three switching states, wherein the hydraulic circuit is configured such that in a first switching state of the valve device, the first collector return line is hydraulically connected to the main pressure line, and in a third switching state of the valve device the second collector return line is hydraulically connected to the main pressure line, and wherein at least in a second switching state of the valve device the distributor pressure lines coupled by the valve device to the main pressure line are each hydraulically connected to the main pressure line and the collector return lines coupled by the valve device to the main return line are each hydraulically connected to the main return line.

13. The hydraulic circuit according to claim 9, wherein the valve device comprises a second hydraulic switching valve that is switchable between at least a first switching state and a second switching state, and wherein the second hydraulic switching valve is a reversing valve.

14. The hydraulic circuit according to claim 9, wherein the valve device comprises a second hydraulic switching valve which is switchable between at least a first switching state and a second switching state, and wherein a first inlet connection of the second hydraulic switching valve is hydraulically coupled to the main pressure line, a second inlet connection of the second hydraulic switching valve is hydraulically connected to the first outlet connection of the first hydraulic switching valve, a third inlet connection of the second hydraulic switching valve is hydraulically coupled to the main return line, a fourth inlet connection of the second hydraulic switching valve is hydraulically connected to the second outlet connection of the first hydraulic switching valve, a first outlet connection of the second hydraulic switching valve is hydraulically coupled to the first distributor pressure line, a second outlet connection of the second hydraulic switching valve is hydraulically coupled to the second distributor pressure line, a third outlet connection of the second hydraulic switching valve is hydraulically coupled to the first collector return line, and a fourth outlet connection of the second hydraulic switching valve is hydraulically coupled to the second collector return line.

15. The hydraulic circuit according to claim 9, wherein the valve device comprises a second hydraulic switching valve that is switchable between at least a first switching state and a second switching state, and wherein the second hydraulic switching valve is configured such that in the first switching state of the second hydraulic switching valve, the first inlet connection of the second hydraulic switching valve is hydraulically connected to the second outlet connection of the second hydraulic switching valve, the second inlet connection of the second hydraulic switching valve is hydraulically connected to the first outlet connection of the second hydraulic switching valve, the third inlet connection of the second hydraulic switching valve is hydraulically connected to the fourth outlet connection of the second hydraulic switching valve, and the fourth inlet connection of the second hydraulic switching valve is hydraulically connected to the third outlet connection of the second hydraulic switching valve, and in the second switching state of the second hydraulic switching valve, the first inlet connection of the second hydraulic switching valve is hydraulically connected to the first outlet connection of the second hydraulic switching valve, the second inlet connection of the second hydraulic switching valve is hydraulically connected to the second outlet connection of the second hydraulic switching valve, the third inlet connection of the second hydraulic switching valve is hydraulically connected to the third outlet connection of the second hydraulic switching valve, and the fourth inlet connection of the second hydraulic switching valve is hydraulically connected to the fourth outlet connection of the second hydraulic switching valve.

16. The hydraulic circuit according to claim 1, wherein the hydraulic circuit comprises one or more hydraulically actuable switching groups, wherein each of the switching groups is assigned to either the first part circuit and hydraulically coupled to the first distributor pressure line as well as the first collector return line or assigned to the second part circuit and hydraulically coupled to the second distributor pressure line as well as the second collector return line, wherein if a plurality of switching groups is provided, at least one switching group is assigned to the first part circuit and at least one switching group to the second part circuit.

17. The hydraulic circuit according to claim 1, wherein the hydraulic circuit comprises a control device having a fault detection device, wherein the control device is thereby configured to switch the hydraulic circuit into the second operating state when the fault detection device detects a defined malfunction.

18. The hydraulic circuit according to claim 17, wherein the control device is configured to control the valve device such that the valve device switches either into a first switching state or a third switching state.

19. A torque transmission device having a hydraulically actuable dual-clutch with a hydraulic circuit, wherein the hydraulic circuit is configured in accordance with claim 1.

20. A vehicle comprising a torque transmission device having a hydraulically actuable dual-clutch with a hydraulic circuit, wherein the torque transmission device is configured in accordance with claim 19.

21. A method for operating a hydraulic circuit configured in accordance with claim 17, wherein in a first step the fault detection device checks whether a defined malfunction is present, and in a second step, when a defined malfunction is detected, the hydraulic circuit is switched into the second operating state, wherein the valve device is switched either to a first switching state or to a third switching state thereto.

22. A method for operating a vehicle having a torque transmission device according to claim 19, wherein in a first step a fault detection device of the hydraulic circuit checks whether a defined malfunction is present, and in a further step, when a defined malfunction is detected, the hydraulic circuit is switched into the second operating state in a second step, wherein the valve device is switched either to a first switching state or to a third switching state thereto.

23. The method according to claim 22, wherein the vehicle furthermore comprises a driving state detection device, the method further comprising the driving state detection device detecting a driving state, and when a defined malfunction is detected in the first step the valve device of the torque transmission device is switched in the second step to either the first switching state or the third switching state as a function of the detected driving state.

* * * * *